(12) United States Patent
Ouchida

(10) Patent No.: US 12,420,623 B2
(45) Date of Patent: Sep. 23, 2025

(54) ENERGY STORAGE DEVICE AND WORK MACHINE

(71) Applicant: Yanmar Holdings Co., Ltd., Osaka (JP)

(72) Inventor: Takeshi Ouchida, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/607,371

(22) Filed: Mar. 15, 2024

(65) Prior Publication Data

US 2024/0309609 A1   Sep. 19, 2024

(30) Foreign Application Priority Data

Mar. 16, 2023  (JP) ................. 2023-041509
Jan. 16, 2024   (JP) ................. 2024-004667

(51) Int. Cl.
*B60K 6/10* (2006.01)
*E02F 9/22* (2006.01)
*F16H 47/04* (2006.01)

(52) U.S. Cl.
CPC ............ *B60K 6/105* (2013.01); *E02F 9/2217* (2013.01); *E02F 9/2296* (2013.01); *F16H 47/04* (2013.01); *B60W 2300/17* (2013.01); *F05B 2260/421* (2013.01); *Y02E 60/16* (2013.01)

(58) Field of Classification Search
CPC ......... B60K 6/10; B60K 6/105; E02F 9/2217; E02F 9/2235; E02F 9/2296; F16H 33/02; F16H 47/04; F05B 2260/421; Y02E 60/16; F03G 3/08; B60W 2300/17
See application file for complete search history.

(56) References Cited

U.S. PATENT DOCUMENTS

| | | | | |
|---|---|---|---|---|
| 4,382,392 A | * | 5/1983 | Meyerle | B60K 17/10 475/81 |
| 9,334,939 B2 | * | 5/2016 | Krittian | F16H 61/42 |
| 10,926,619 B2 | * | 2/2021 | Deakin | B60K 25/02 |
| 2012/0097460 A1 | * | 4/2012 | Owada | E02F 9/2232 180/6.58 |
| 2022/0200291 A1 | * | 6/2022 | Guo | B60W 10/06 |

FOREIGN PATENT DOCUMENTS

| | | | | |
|---|---|---|---|---|
| CN | 104141644 A | * | 11/2014 | ............. F04B 47/04 |
| CN | 111501870 A | * | 8/2020 | ............. E02F 3/42 |
| EP | 2490909 B1 | * | 8/2017 | ............. B60K 6/105 |
| GB | 2559345 A | * | 8/2018 | ............. B60K 25/02 |
| JP | 60263766 A | * | 12/1985 | |
| JP | 2016-176437 A | | 10/2016 | |

(Continued)

OTHER PUBLICATIONS

Machine translation of SU 1025536 A1 obtained on Feb. 6, 2025.*

(Continued)

*Primary Examiner* — Adam D Rogers
(74) *Attorney, Agent, or Firm* — NORTON ROSE FULBRIGHT US LLP

(57) ABSTRACT

An exemplary energy storage device is an energy storage device capable of storing energy, which includes a flywheel driven by a motor to store and release rotation energy and a hydraulic element disposed between the motor and the flywheel to change the rotation speed of the flywheel.

15 Claims, 10 Drawing Sheets

(56) References Cited

FOREIGN PATENT DOCUMENTS

SU          1025536 A1  *  6/1983
WO   WO-2020121003 A2  *  6/2020

OTHER PUBLICATIONS

Moog Radial Piston Pump RKP; https://www.moog.com/literature/ICD/Moog-Pumps-RKP-Catalog-en.pdf; Published Nov. 2018 (Year: 2018).*
European Extended Search Report dated Jul. 23, 2024, issued in EP Application No. 24160613.6.
Catalog of "Radial Piston Pump RKP", by Rev. K, dated Nov. 30, 2018, XP093183448, retrieved from the Internet: URL: https://www.moog.com/literature/ICD/Moog-Pumps-RKP-Catalog-en.pdf, retrieved on Jul. 8, 2024.

* cited by examiner

ENERGY STORAGE DEVICE AND WORK MACHINE

CROSS-REFERENCE TO RELATED APPLICATION

This application claims priority under 35 U.S.C. § 119 to Japanese Patent Application Nos. JP2023-041509, filed on Mar. 16, 2023 and JP2024-004667, filed on Jan. 16, 2024, the entire contents of which are hereby incorporated by reference in their entireties.

TECHNICAL FIELD

The present invention relates to a technique of storing and releasing energy by using a flywheel.

BACKGROUND ART

Conventionally, a flywheel regenerative system has been known as a technique for enhancing an energy efficiency (see, for example, Patent Document 1). In this system, the rotation energy of a drive shaft is converted into the rotation energy of a flywheel at the time of braking of a vehicle, and the converted rotation energy is stored. The stored energy is reused as the rotation energy of the drive shaft, i.e., kinetic energy for traveling the vehicle.

PRIOR ART DOCUMENT

Patent Document

Patent Document 1: JP-A-2016-176437

SUMMARY OF INVENTION

Technical Problem

In Patent Document 1, the flywheel that stores and releases the rotation energy is connected to a motor drive shaft via a reducer and a clutch. In the case of such a configuration, when two rotating bodies are connected using the clutch, there are concerns that impact may occur on the clutch or a frictional power loss may occur in the clutch. In particular, in a case where a difference in a rotation speed between the two rotating bodies increases, there are concerns that the impact or the frictional power loss occurs.

The present invention is intended to provide a technique suitable for an energy system that stores and releases rotation energy by using a flywheel.

Solution to Problem

An exemplary energy storage device of the present invention is an energy storage device capable of storing energy, which includes a flywheel driven by a motor to store and release rotation energy and a hydraulic element disposed between the motor and the flywheel to change the rotation speed of the flywheel.

Advantageous Effects of Invention

According to the example of the present invention, the technique suitable for the energy system that stores and releases the rotation energy by using the flywheel can be provided.

DESCRIPTION OF EMBODIMENTS

Figure 1:
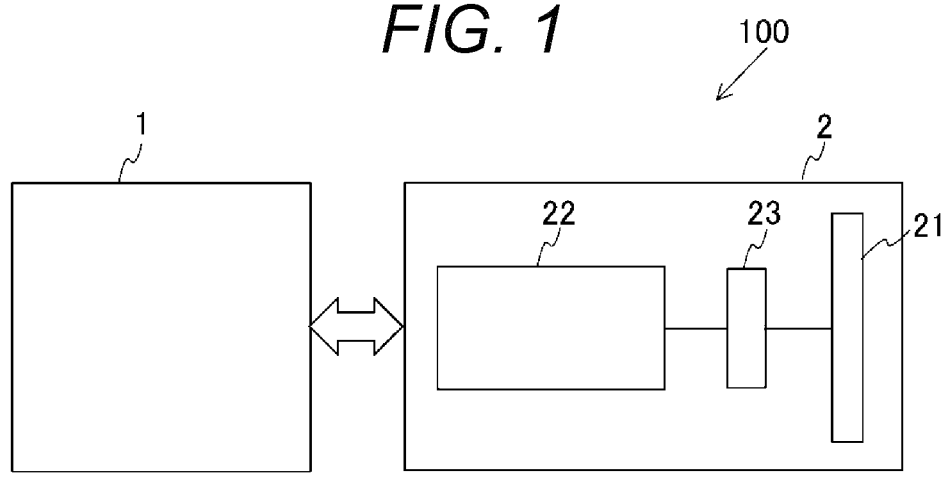
FIG. 1 is a schematic diagram showing the outline of an energy storage system.

An embodiment of the present invention will be described with reference to the drawings. Note that in the figures, the same or equivalent elements are denoted by the same reference numerals and description thereof will not be repeated unless otherwise required.

1. Outline of Energy Storage System

FIG. 1 is a schematic diagram illustrating the outline of an energy storage system 100 according to the embodiment of the present invention. In FIG. 1, a white arrow indicates the flow of energy. As illustrated in FIG. 1, the energy storage system 100 includes a motor 1 and an energy storage device 2.

In the present embodiment, the motor 1 is an internal combustion engine. Note that the motor 1 may be a component other than the internal combustion engine. The motor 1 may be, for example, an electric motor or an external combustion engine such as a steam turbine.

The energy storage device 2 is capable of storing energy. Specifically, the energy storage device 2 is capable of storing part of energy output from the motor 1 as rotation energy. Moreover, the energy storage device 2 is capable of releasing the stored energy. Specifically, the energy storage device 2 is capable of releasing the stored rotation energy to the motor 1. The released energy is used as energy for assisting the output of the motor 1. As will be described in detail later, the energy storage device 2 levels the load of the motor 1 to enable the motor 1 to be operated with a high efficiency.

The energy storage device 2 includes a flywheel 21 and a hydraulic element 22.

The flywheel 21 is driven by the motor 1. The flywheel 21 stores and releases the rotation energy. When storing the energy, the flywheel 21 increases the number of rotations by using the energy output from the motor 1 to store the rotation energy. When releasing the energy, the flywheel 21 decreases the number of rotations to release the rotation energy. Note that the flywheel 21 switches between storage and release of the energy according to operation of the hydraulic element 22. The flywheel 21 is made of metal such as steel, for example.

The hydraulic element 22 is disposed between the motor 1 and the flywheel 21, and changes the rotation speed of the flywheel 21. Specifically, at the time of storage of the energy, the hydraulic element 22 increases the speed of the flywheel 21. At the time of release of the energy, the hydraulic element 22 decreases the speed of the flywheel 21. The hydraulic element 22 is a hydraulic power transmission device. More specifically, the hydraulic element 22 is a continuously variable transmission using hydraulic pressure. By arranging the hydraulic element 22 between the motor 1 and the flywheel 21, two rotating bodies (an output shaft of the motor 1 and the flywheel 21) can be connected while reducing occurrence of impact or a frictional power loss.

In the present embodiment, the energy storage device 2 includes a reducer 23 disposed between the hydraulic element 22 and the flywheel 21. The reducer 23 decreases the rotation speed of the flywheel 21, and transmits the rotation speed to the hydraulic element 22. In other words, the reducer 23 increases the rotation speed on the output side of the hydraulic element 22, and transmits the rotation speed to the flywheel 21. Since the rotation speed on the output side of the hydraulic element 22 can be increased and transmitted to the flywheel 21 by the reducer 23, the energy stored in the flywheel 21 can be increased.

Note that the reducer 23 is not an essential component and is not necessarily provided. In the present embodiment, the reducer 23 is provided in order to set the rotation speed of the flywheel 21 that stores the energy to a target speed. The target speed can be appropriately set according to, e.g., the use purpose of the energy storage device 2.

Figure 2:
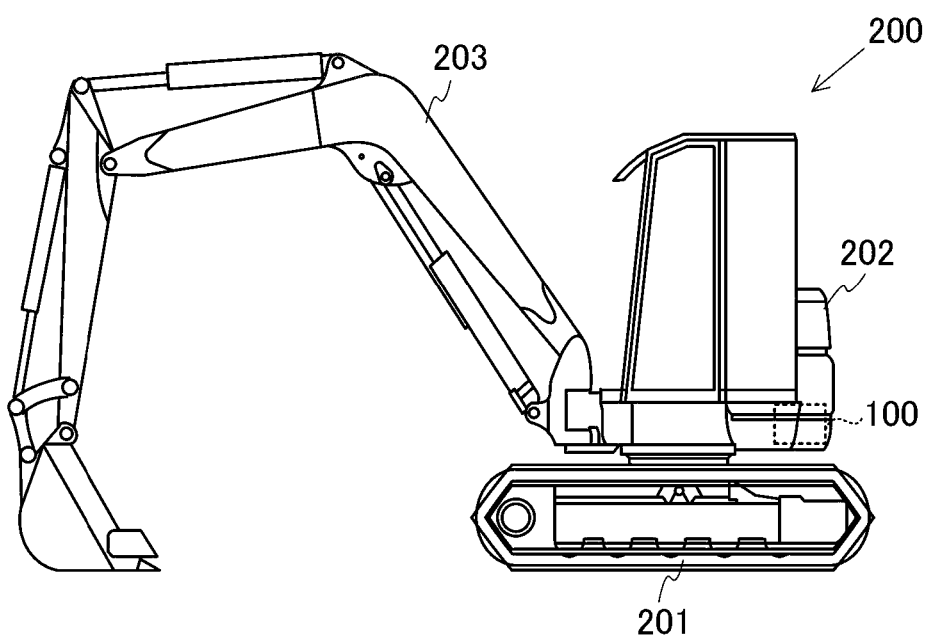
FIG. 2 is a view for describing an application example of the energy storage system.

FIG. 2 is a view for describing an application example of the energy storage system 100 according to the embodiment of the present invention. Specifically, FIG. 2 illustrates an example where the energy storage system 100 is applied to a work machine 200. In FIG. 2, the work machine 200 is a backhoe. The work machine 200 includes the energy storage system 100. That is, the work machine 200 includes the motor 1 and the energy storage device 2.

Note that the energy storage system 100 may be applied to a work machine other than the backhoe. For example, the energy storage system 100 may be applied to, e.g., a construction machine other than the backhoe or an agricultural work machine. In addition, the energy storage system 100 may be widely applied to a device including a motor, such as an automobile, a railway vehicle, or a ship.

The work machine 200 includes a crawler traveling body 201, a turning body 202 rotatably disposed on the upper side of the traveling body 201, and a work device 203 attached to the turning body 202. The energy storage system 100 is disposed inside the turning body 202, for example. The motor 1 forming the energy storage system 100 drives not only the flywheel 21, but also a pump (not illustrated) disposed inside the turning body 202. The pump is a hydraulic pump that supplies pressurized oil to a hydraulic actuator mounted on the work machine 200. The hydraulic actuator includes a traveling hydraulic motor that causes the traveling body 201 to travel, a turning hydraulic motor that causes the turning body 202 to rotate, and a hydraulic cylinder that actuates the work device 203.

Figure 3A:
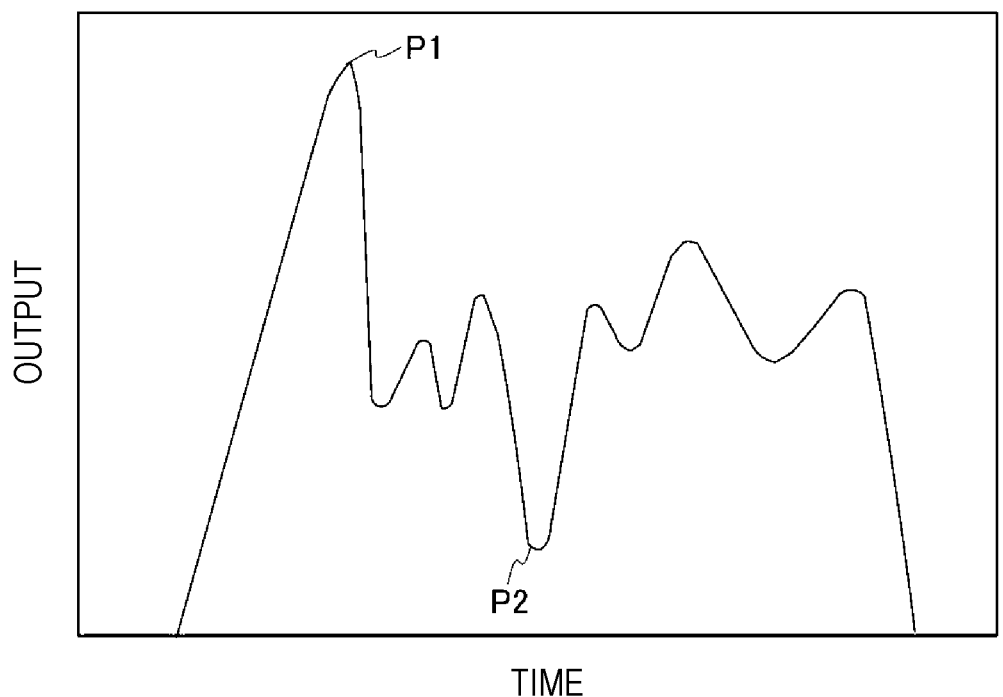
FIG. 3A is a graph for describing operation of the energy storage system in a work machine.
Figure 3B:
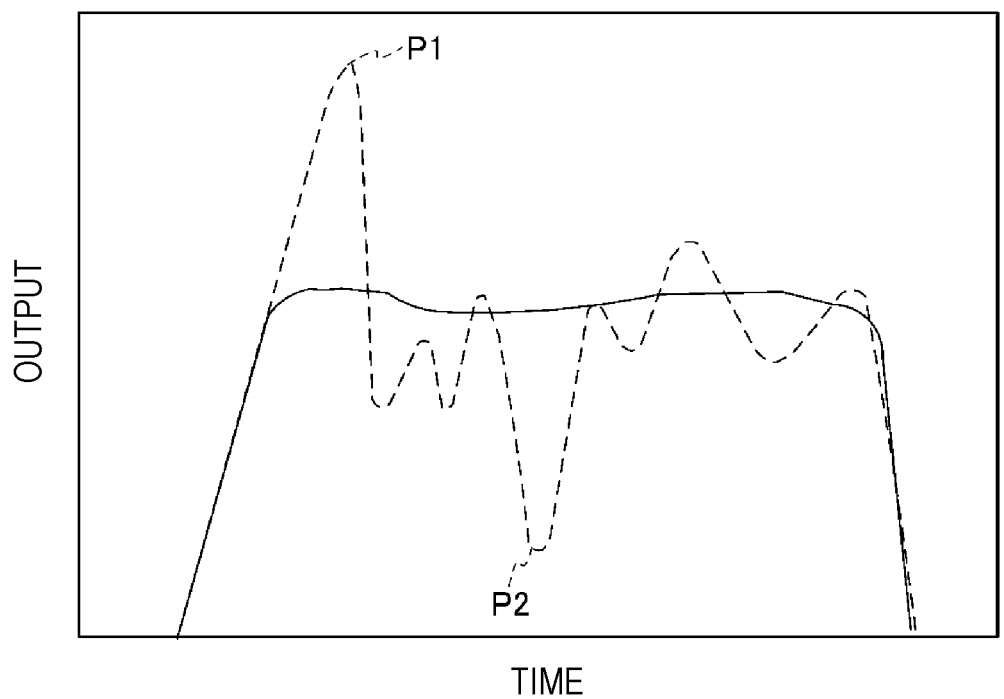
FIG. 3B is a graph for describing operation of the energy storage system in the work machine.

FIGS. 3A and 3B are graphs for describing operation of the energy storage system 100 in the work machine 200.

FIG. 3A is a graph illustrating a time change in the output of the motor 1 in a case where the work machine 200 performs a certain work. In FIG. 3A, it is assumed that the energy storage device 2 is not used (not connected to the motor 1). In addition, as the certain work, a work including the following three works is assumed. Among the three works, a first work performed initially includes a work of lifting earth and sand by using the work device 203. A second work to be performed next includes a work of turning the turning body 202 to lower the lifted earth and sand to another location. A third work performed last includes a work of returning the work device 203 to a place where earth and sand are present.

In the first work, the output of the motor 1 increases because the operation of lifting the earth and sand is performed by using the work device 203. An upwardly-raised peak P1 at which the output in FIG. 3A is maximized is generated at the time of the first work. Since the second work includes the operation of lowering the earth and sand from above, the output of the motor 1 can be low in the second work. A downwardly-raised peak P2 at which the output in FIG. 3A is minimized is generated at the time of the second work. In the third work, the output of the motor 1 is not particularly increased or decreased because the operation of lifting or turning the work device 203 with no load.

FIG. 3B is a graph illustrating a time change in the output of the motor 1 in a case where the work similar to that in the case of FIG. 3A is performed by using the energy storage device 2. In FIG. 3B, a solid graph is a graph in a case where the energy storage device 2 is used, and a dashed graph is a graph in a case where the energy storage device 2 is not used. The dashed graph is a graph for comparison and is the same as the graph illustrated in FIG. 3A.

In the configuration using the energy storage device 2, in a case where the output required for the motor 1 is high, an increase in the output of the motor 1 can be suppressed by releasing the rotation energy from the flywheel 21. In a case where the output required for the motor 1 is low, the rotation energy can be applied from the motor 1 to the flywheel 21 to store the rotation energy without particularly increasing the output of the motor 1. Thus, in a case where the energy storage device 2 is used, as illustrated in FIG. 3B, the output of the motor 1 at the time of the work can be made constant. In other words, it is possible to implement highly-efficient operation by leveling the load of the motor 1. In a case where the energy storage device 2 is used, the work machine 200 can be operated with a low fuel consumption.

Note that in the example illustrated in FIG. 3B, the energy is released from the energy storage device 2 (flywheel 21) at the time of lifting the earth and sand in the first work, and the released energy is used as the energy for assisting the output of the motor 1. In addition, at the time of the work of lowering the earth and sand in the second work, a surplus output obtained by subtracting the output required for the work in the motor 1 is used for storing the energy in the energy storage device 2 (flywheel 21).

2. Configuration Example of Energy Storage Device

Figure 4:
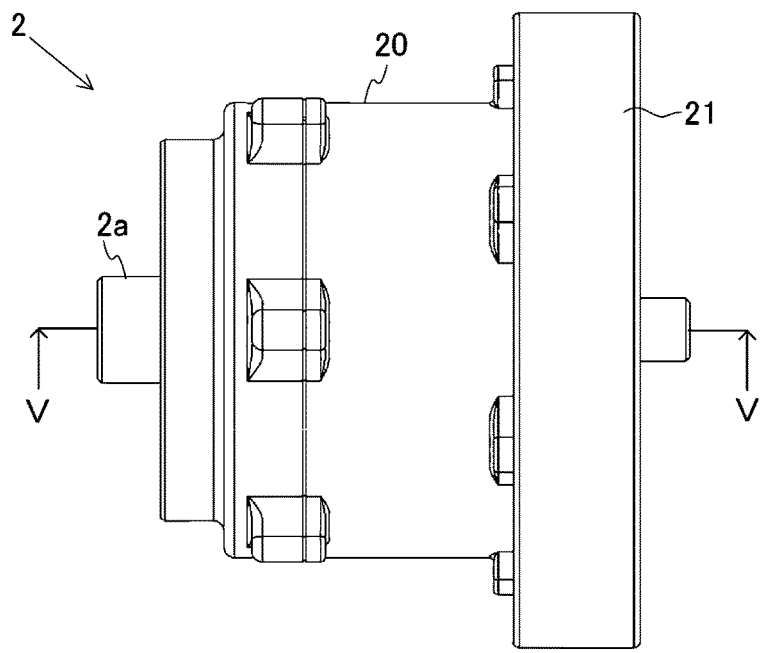
FIG. 4 is a side view illustrating a schematic configuration of an energy storage device.
Figure 5:
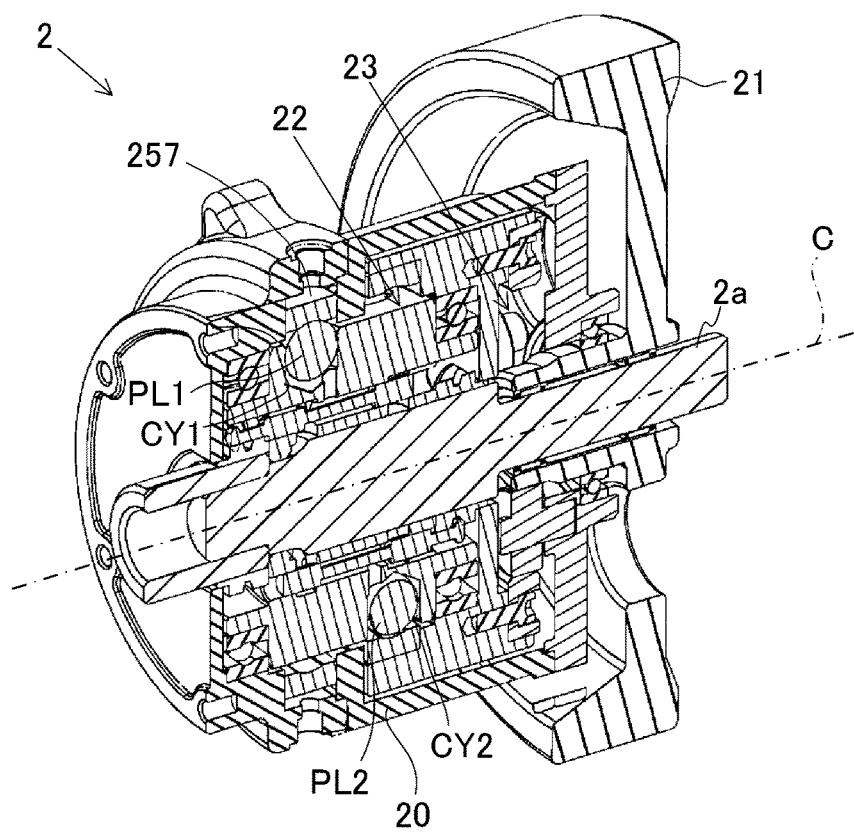
FIG. 5 is a sectional perspective view illustrating a section taken along line V-V in FIG. 4.

Next, a detailed example of the energy storage device 2 provided in the energy storage system 100 will be described. FIG. 4 is a side view illustrating the outline configuration of the energy storage device 2 according to the embodiment of the present invention. FIG. 5 is a sectional perspective view illustrating a section taken along line V-V in FIG. 4.

Hereinafter, a direction in which a center axis C illustrated in FIG. 5 extends will be defined as an axial direction. Moreover, a direction perpendicular to the center axis C (axial direction) will be defined as a radial direction. In the axial direction, a side on which the hydraulic element 22 is located with respect to the flywheel 21 will be defined as a front, and a front-rear direction in the axial direction will be defined. Note that these directions are names used merely for description and are not intended to limit actual positional relationships and directions.

As illustrated in FIGS. 4 and 5, the energy storage device 2 includes a columnar shaft 2a extending along the center axis C. The rotation power of the motor 1 is input to the shaft 2a. The energy storage device 2 includes the hydraulic element 22 disposed outside the shaft 2a in the radial direction. In addition, the energy storage device 2 includes the reducer 23 disposed outside the shaft 2a in the radial direction and disposed in rear of the hydraulic element 22 in the axial direction. Further, the energy storage device 2 includes the annular flywheel 21 disposed outside the shaft 2a in the radial direction and disposed in rear of the reducer 23 in the axial direction.

The flywheel 21, the hydraulic element 22, and the reducer 23 are all disposed about the center axis C. That is, the reducer 23 is arranged coaxially with the hydraulic element 22 and the flywheel 21. The energy storage device 2 of the present embodiment can be reduced in size as compared to a case where a plurality of elements forming the device is disposed along different axes. In other words, the occupied volume of the energy storage device 2 of the present embodiment can reduced.

In addition, the energy storage device 2 includes a housing 20. The housing 20 has a tubular shape extending in the axial direction about the center axis C. Lids are disposed at both end portions of the housing 20 in the axial direction. The housing 20 houses the hydraulic element 22 and the reducer 23. Specifically, the housing 20 integrally houses the hydraulic element 22 and the reducer 23. The energy storage device 2 of the present embodiment can be reduced in size as compared to a case where there is a plurality of housings that houses elements forming the device. In other words, the occupied volume of the energy storage device 2 of the present embodiment can reduced. Note that the flywheel 21 is disposed in rear of the housing 20 in the axial direction.

Figure 6:
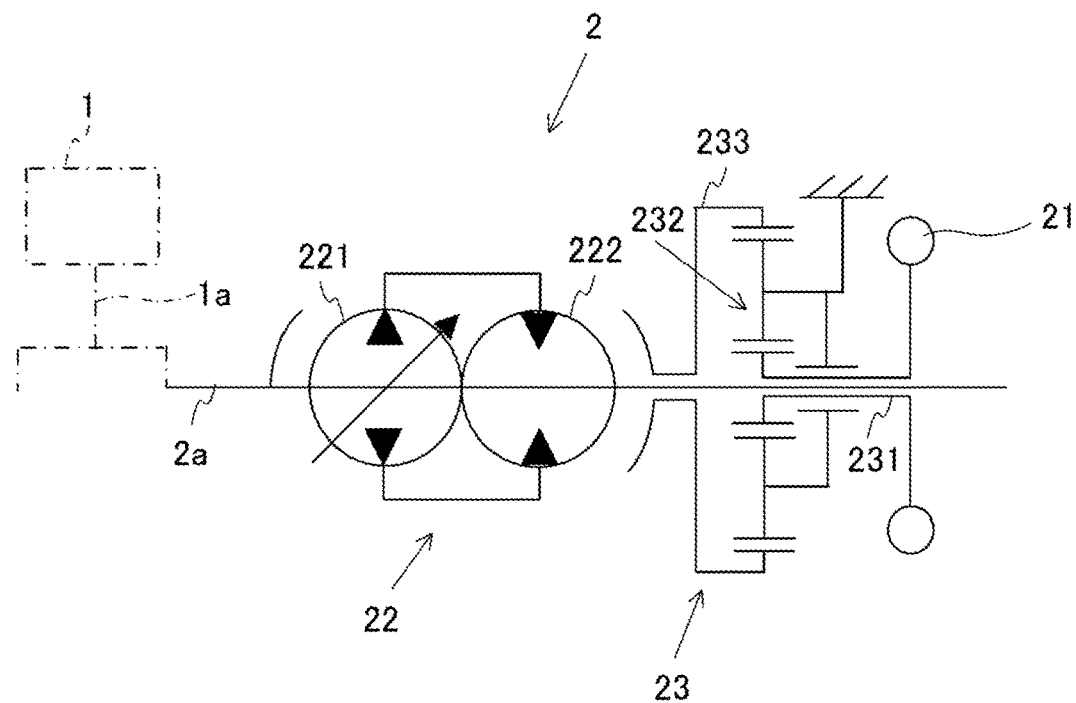
FIG. 6 is a diagram schematically illustrating the configuration of the energy storage device.

FIG. 6 is a diagram schematically illustrating the configuration of the energy storage device 2 according to the embodiment of the present invention. In FIG. 6, an element which is necessary for the sake of convenience in description and does not form the energy storage device 2 is indicated by a chain line.

As illustrated in FIG. 6, the shaft 2a provided in the energy storage device 2 is connected to the motor 1. That is, the rotation power of the motor 1 is input to the shaft 2a. When the rotation power is input to the shaft 2a, the hydraulic element 22 is driven. Note that the shaft 2a may be directly connected to the output shaft 1a of the motor 1 or may be the output shaft 1a itself of the motor 1, for example. The shaft 2a may be connected to the output shaft 1a of the motor 1 via a power transmission mechanism. The power transmission mechanism may include a gear, a pulley, and a belt.

In the present embodiment, the hydraulic element 22 is a hydromechanical continuously variable transmission. The hydraulic element 22 configured as the hydromechanical continuously variable transmission includes a hydraulic pump 221 and a hydraulic motor 222. In the hydromechanical continuously variable transmission 22, the hydraulic pump 221 and the hydraulic motor 222 are connected via an oil line, and the drive force of the hydraulic pump 221 is recovered on the output side of the transmission. In the present embodiment, the hydraulic pump 221 and the hydraulic motor 222 are integrally configured, and the torque for driving the hydraulic pump 221 is added to the torque for driving the hydraulic motor 222. Since the hydraulic element 22 is the hydromechanical continuously variable transmission, the energy storage device 2 can be operated with a higher efficiency as compared to a case where the hydraulic element 22 is a hydrostatic continuously variable transmission that temporarily converts all the input power into hydraulic pressure.

Note that instead of the hydromechanical continuously variable transmission, the hydraulic element 22 may be a hydrostatic continuously variable transmission in which a hydraulic pump 221 and a hydraulic motor 222 are connected only via an oil line. In a case where the hydraulic element 22 is the hydrostatic continuously variable transmission, the degree of freedom in design can be increased as compared to the case of the hydromechanical continuously variable transmission.

Specifically, the hydraulic pump 221 is a variable displacement hydraulic pump, and the hydraulic motor 222 is a fixed displacement hydraulic motor. By varying the capacity of the hydraulic pump 221 configured as the variable displacement hydraulic pump, the speed of the flywheel 21 can be increased or decreased. Note that unlike the configuration of the present embodiment, the hydraulic pump may be a fixed displacement hydraulic pump and the hydraulic motor may be a variable displacement hydraulic motor.

The capacity of the hydraulic pump 221 configured as the variable displacement hydraulic pump varies, for example, according to a command from a not-illustrated control device. For example, in a case where the output of the motor 1 is controlled to be constant, the above-described control device monitors the output of the motor 1. The output of the motor 1 can be obtained by the product of the torque and number of rotations of the motor 1. In a case where the output of the motor 1 reaches a target value or more, the control device controls the capacity of the hydraulic pump 221 to decelerate the flywheel 21. Accordingly, the energy is released from the flywheel 21, and the required output can be ensured while the output of the motor 1 is maintained at the target value. In a case where the output of the motor 1 reaches the target value or less, the control device controls the capacity of the hydraulic pump 221 to accelerate the flywheel 21. Accordingly, the surplus energy can be stored in the flywheel 21 while the output of the motor 1 can be maintained at the target value.

As illustrated in FIG. 5, the hydraulic pump 221 configured as the variable displacement hydraulic pump has an annular movable member 257. The annular movable member 257 is provided such that the center position of the annular movable member 257 itself is movable in the radial direction with respect to the center axis C. More specifically, the annular movable member 257 is provided so as to move in the radial direction along the section in FIG. 5. The capacity of the hydraulic pump 221 can be changed by moving the annular movable member 257.

The hydraulic pump 221 further has a cylinder CY1 extending in the radial direction and a plunger member PL1 housed in the cylinder CY1. The plunger member PL1 is paired with the movable member 257 to contribute to generation of hydraulic pressure in the hydraulic pump 221. The plunger member PL1 is movable along the cylinder CY1. That is, the plunger member PL1 provided in the hydraulic element 22 moves in the radial direction perpendicular to the axial direction of the hydraulic element. With this configuration, the length of the energy storage device 2 in the axial direction can be decreased as compared to a configuration in which a plunger member moves in the axial direction.

Specifically, the plunger member PL1 is a sphere. Since the plunger member PL1 is formed of the sphere, the number of components forming the plunger member can be reduced. The plunger member PL1 is, for example, a steel ball.

Note that in the present embodiment, the hydraulic motor 222 configured as the fixed displacement hydraulic motor similarly has a cylinder CY2 extending in the radial direction and a plunger member PL2 housed in the cylinder CY2. The plunger member PL2 also moves in the radial direction. The plunger member PL2 is also a sphere, and for example, is a steel ball.

In the present embodiment, the reducer 23 is a planetary gear reducer. As illustrated in FIG. 6, the planetary gear reducer 23 includes a sun gear 231, a planetary gear 232, and an internal gear 233. A planetary carrier that rotatably supports the planetary gear 232 is fixed. The sun gear 231 is coupled to the flywheel 21. The sun gear 231 may be integrated with the flywheel 21. The internal gear 233 is coupled to a rotating element of the hydraulic motor 222. In other words, the internal gear 233 is coupled to an element forming the output side of the hydromechanical continuously variable transmission 22 opposite to the side to which rotation of the motor 1 is input. Since the reducer 23 is the planetary gear reducer, the reducer 23 and the hydraulic element 22 can be arranged coaxially.

As described above, the hydraulic pump 221 of the present embodiment is the variable displacement hydraulic pump. Thus, the energy storage device 2 of the present embodiment specifically includes a hydraulic servo mechanism for making the hydraulic pump 221 a variable displacement element. In other words, the energy storage device 2 includes a hydraulic servo mechanism that controls the capacity of the variable displacement hydraulic pump 221. The hydraulic servo mechanism will be described below.

Note that as described above, the hydraulic element 22 of the present embodiment is a radial piston type hydraulic element in which the plunger members PL1, PL2 (see FIG. 5) move in the radial direction. The hydraulic servo mechanism of the present embodiment described below has a configuration suitable for the radial piston type hydraulic element.

Figure 7:
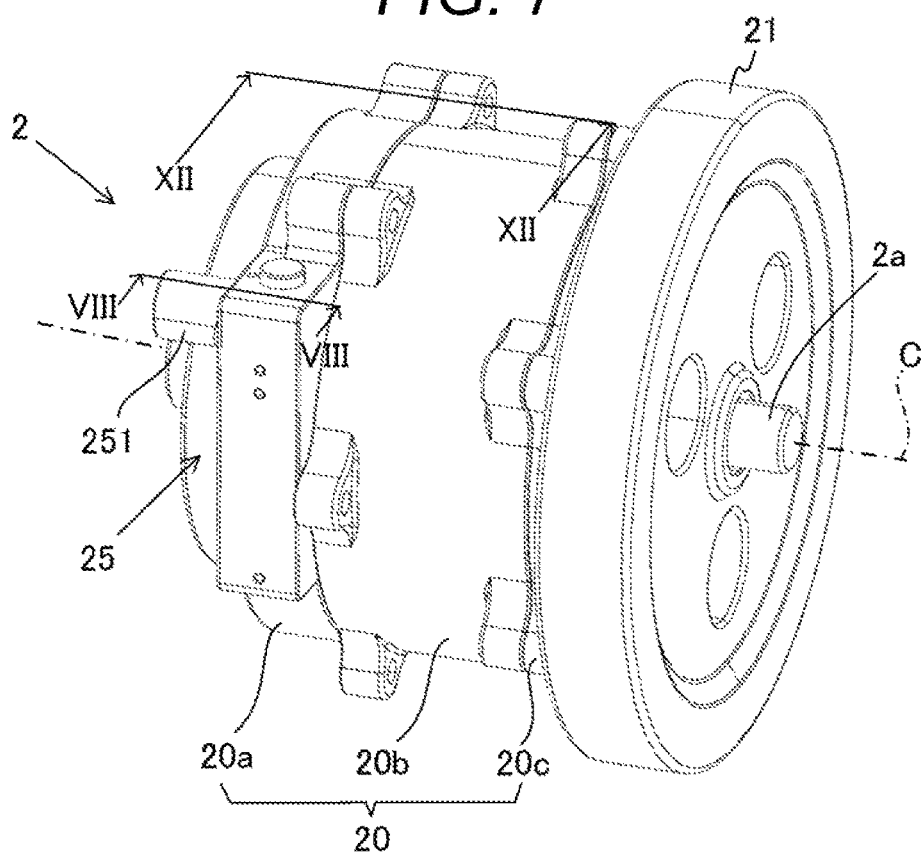
FIG. 7 is a perspective view illustrating the outline configuration of the energy storage device including a hydraulic servo mechanism.

FIG. 7 is a perspective view illustrating the outline configuration of the energy storage device 2 including a hydraulic servo mechanism 25. Note that the energy storage device 2 illustrated in FIG. 7 basically has the same configuration as that of the energy storage device 2 illustrated in FIGS. 4 and 5. FIG. 7 illustrates a configuration related to the hydraulic servo mechanism 25 which is not illustrated in FIGS. 4 and 5.

As illustrated in FIG. 7, the energy storage device 2 includes a front case 20a provided with the hydraulic servo mechanism 25. Note that the front case 20a is a member forming the housing 20 described above. Specifically, the housing 20 includes three members which are the front case 20a, an intermediate case 20b arranged in rear of the front case 20a, and a rear case 20c arranged in rear of the intermediate case 20b. The front case 20a includes a lid on the front side of the housing 20. The rear case 20c includes a lid on the rear side of the housing 20.

Figure 8:
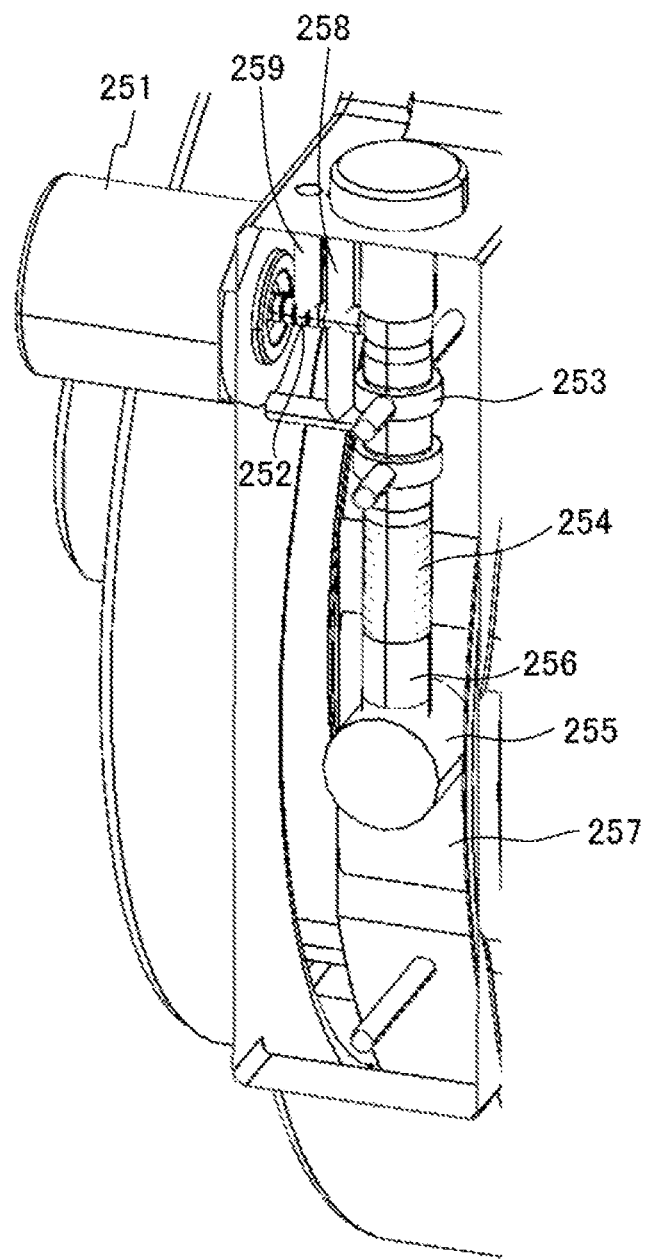
FIG. 8 is a view illustrating an internal structure when cut along line VIII-VIII in FIG. 7.

FIG. 8 is a view illustrating an internal structure when cut along line VIII-VIII in FIG. 7. As illustrated in FIGS. 7 and 8, the hydraulic servo mechanism 25 includes a solenoid 251, a solenoid valve 252, a servo valve 253, a servo spring 254, a pin 255, a feedback spool 256, and a ring 257. Note that the ring 257 is the same as the annular movable member 257 included in the hydraulic pump 221 as described above. That is, the variable displacement hydraulic pump 221 includes the ring 257 provided in the hydraulic servo mechanism 25. In addition, the hydraulic servo mechanism 25 includes an oil passage including a supply port 258 and a drain port 259, and these oil passages are provided inside the front case 20a.

Figure 9:
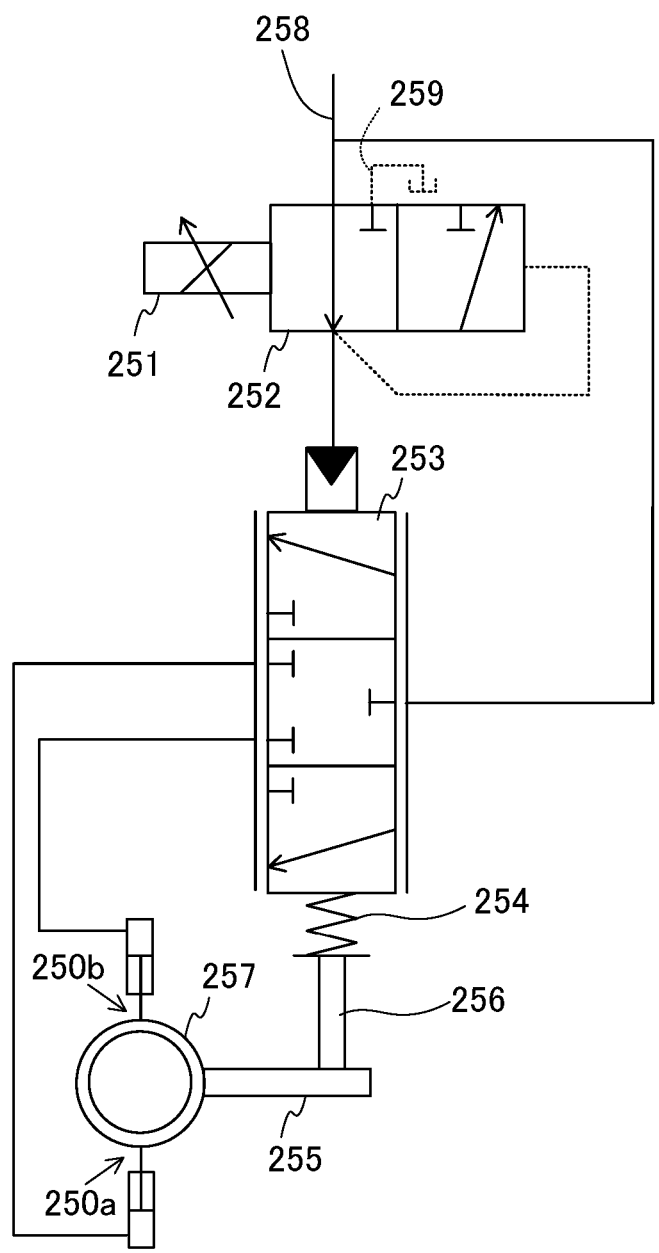
FIG. 9 is a diagram illustrating a hydraulic circuit of the hydraulic servo mechanism.

FIG. 9 is a diagram illustrating a hydraulic circuit of the hydraulic servo mechanism 25. In a case where the solenoid 251 is in an energized state, the solenoid valve 252 is opened, and pilot pressure acts on the servo valve 253 by the inflow of hydraulic oil from the supply port 258. By the action of the pilot pressure, the servo valve 253 is brought into a state in which the hydraulic oil flowing from the supply port 258 flows into a first oil chamber 250a described in detail later. When the hydraulic oil flows into the first oil chamber 250a, the ring 257 receives force in a direction (upward in FIG. 9) from the first oil chamber 250a toward a second oil chamber 250b described in detail later, and moves in the direction in which the force is received.

On the other hand, in a case where the solenoid 251 is in a non-energized state, the solenoid valve 252 is closed, and the pilot pressure acting on the servo valve 253 is zero. In this case, by the biasing force of the servo spring 254, the servo valve 253 is brought into a state in which the hydraulic oil flowing from the supply port 258 flows into the second oil chamber 250b. When the hydraulic oil flows into the second oil chamber 250b, the ring 257 receives force in a direction (downward in FIG. 9) from the second oil chamber 250b toward the first oil chamber 250a, and moves in the direction in which the force is received.

As can be seen from above, the variable displacement hydraulic pump 221 includes the ring 257 provided so as to be movable in position by the hydraulic servo mechanism 25. The pin 255 is attached to the outer peripheral surface of the ring 257, and converts the position of the ring 257 (position in the up-down direction in FIG. 9) to the position of the feedback spool 256 (position in the up-down direction in FIG. 9). The hydraulic servo mechanism 25 adjusts the position of the ring 257 to a position corresponding to a command from the not-illustrated control device while causing the feedback spool 256 to feed back the position. The variable displacement hydraulic pump 221 discharges the hydraulic oil toward the hydraulic motor 222 at a discharge amount determined according to the position of the ring 257 adjusted by the hydraulic servo mechanism 25.

Note that the hydraulic element 22, which is the hydromechanical continuously variable transmission, outputs a rotation speed obtained by adding a motor rotation speed corresponding to the discharge amount of the variable displacement hydraulic pump 221 to the rotation speed (input shaft rotation speed) of the shaft 2a. According to the capacity of the variable displacement hydraulic pump 221, which changes according to the position of the ring 257, the output rotation speed is in an acceleration state greater than the input rotation speed, a constant speed state equal to the input speed, or a deceleration state less than the input speed.

Figure 10:
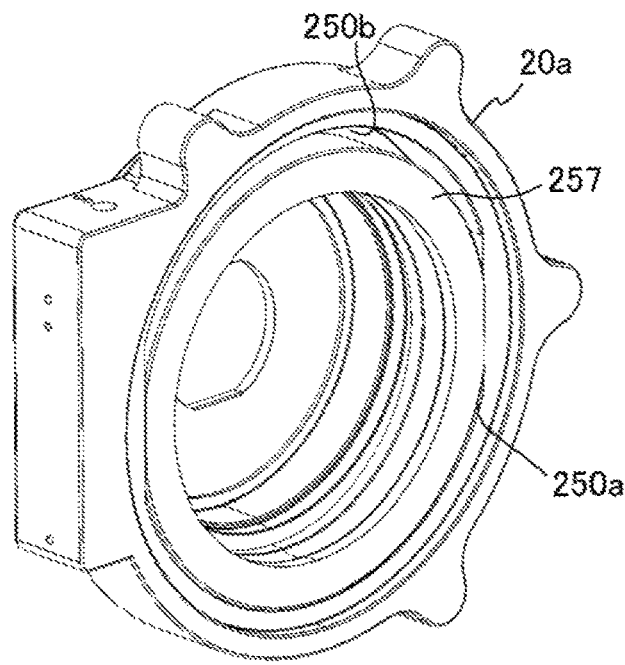
FIG. 10 is a schematic perspective view illustrating a relationship between a front case and a ring.
Figure 11:
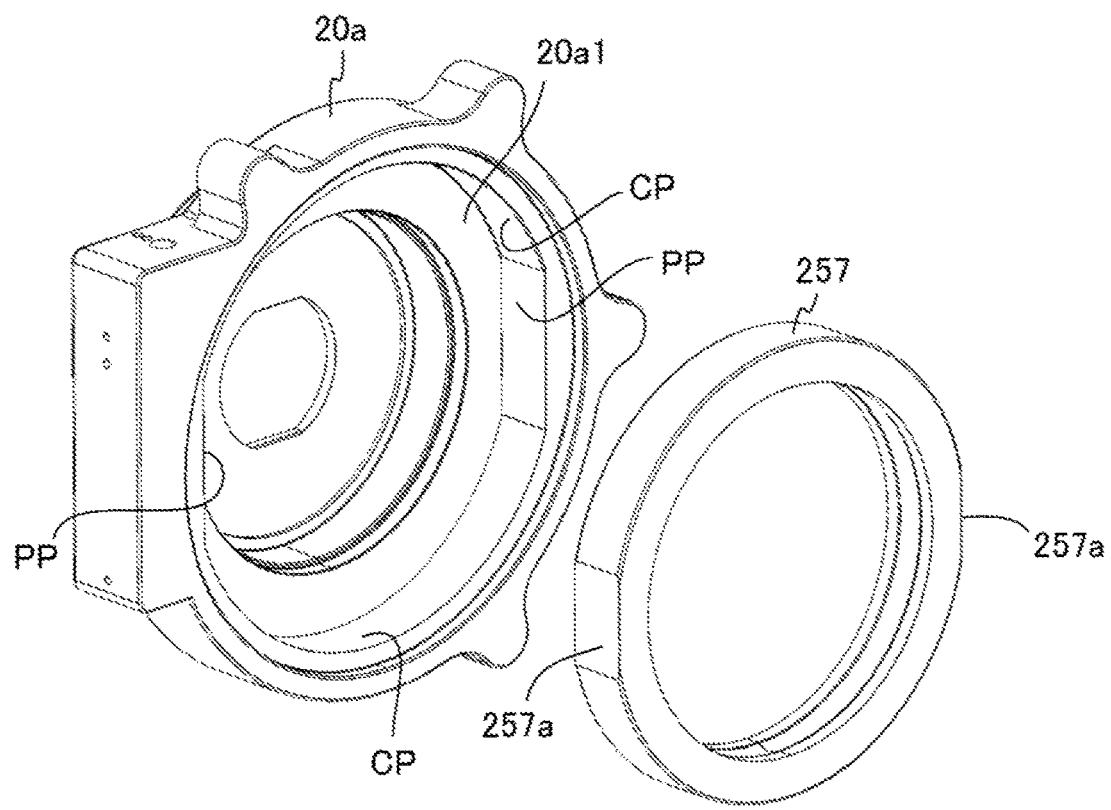
FIG. 11 is a schematic exploded perspective view illustrating the front case and the ring illustrated in FIG. 10 in a disassembled state.
Figure 12:
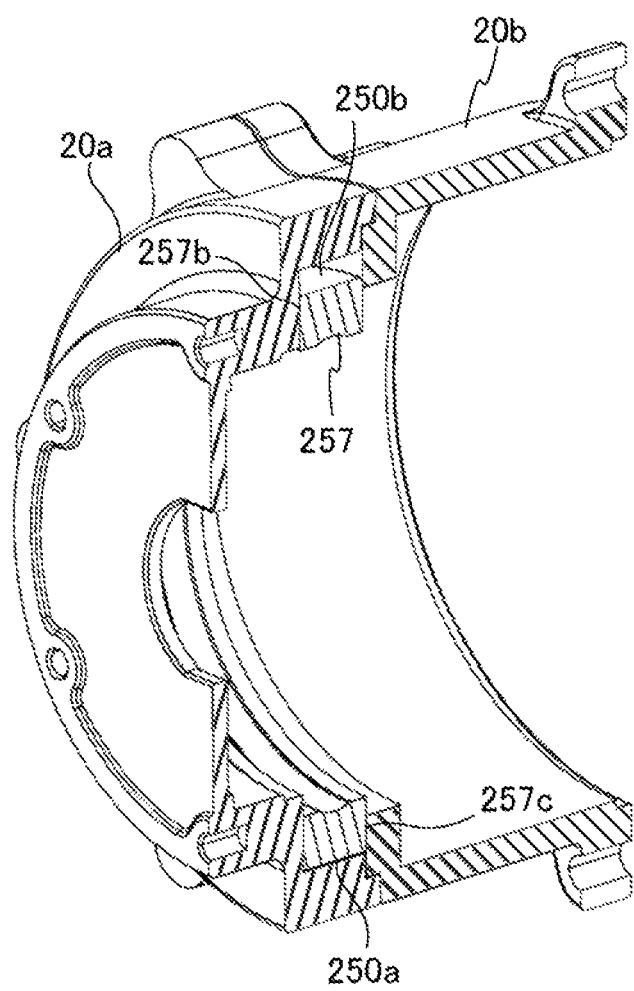
FIG. 12 is a schematic sectional perspective view illustrating a relationship between the front case, an intermediate case, and the ring.

FIG. 10 is a schematic perspective view illustrating a relationship between the front case 20a and the ring 257. FIG. 11 is a schematic exploded perspective view illustrating the front case 20a and the ring 257 illustrated in FIG. 10 in a disassembled state. FIG. 12 is a schematic sectional perspective view illustrating a relationship between the front case 20a, the intermediate case 20b, and the ring 257. Note that FIG. 12 is a sectional view taken along line XII-XII in FIG. 7.

As illustrated in FIGS. 10 to 12, the variable displacement hydraulic pump 221 has the cases 20a, 20b surrounding the outer periphery of the ring 257. Specifically, the ring 257 is housed in the bottomed cup-shaped front case 20a opening rearward in a posture in which the thickness direction of the ring 257 is parallel to the axial direction (front-rear direction). A housing recess 20a1 of the front case 20a housing the ring 257 has an oval shape (rectangular shape with rounded corners) in plan view from the axial direction. That is, the inner surface of the housing recess 20a1 has curved portions CP and flat portions PP.

The ring 257 is basically cylindrical. Note that in the outer peripheral surface of the ring 257, a pair of flat parts 257a arranged symmetrically with respect to the center axis C is provided in accordance with the shape of the housing recess 20a1. The ring 257 is housed in the housing recess 20a1 in a state in which each of the pair of flat parts 257a contacts the flat portion PP of the housing recess 20a1.

The variable displacement hydraulic pump 221 has the first oil chamber 250a and the second oil chamber 250b provided between the ring 257 and the cases 20a, 20b and partitioned from each other. Both the first oil chamber 250a and the second oil chamber 250b are provided between the outer peripheral surface of the ring 257 and the inner peripheral surface of the housing recess 20a1 in the radial direction. Specifically, the first oil chamber 250a is provided, in the radial direction, between one of two outer peripheral surfaces connecting the pair of flat parts 257a of the ring 257 and one of the two curved portions CP connecting the pair of flat portions PP of the inner surface forming the housing recess 20a1. The second oil chamber 250b is provided, in the radial direction, between the other one of the two outer peripheral surfaces connecting the pair of flat parts 257a of the ring 257 and the other one of the two curved portions CP connecting the pair of flat portions PP of the inner surface forming the housing recess 20a1. The first oil chamber 250a and the second oil chamber 250b are provided with the ring 257 interposed therebetween in the radial direction.

As described above, the hydraulic oil appropriately flows into the first oil chamber 250a and the second oil chamber 250b according to the operation state of the hydraulic servo mechanism 25. Then, the position of the ring 257 changes according to the state of the inflow of the hydraulic oil into the first oil chamber 250a and the second oil chamber 250b. That is, in the present embodiment, the first oil chamber 250a and the second oil chamber 250b are formed using the ring 257 itself which is the variable displacement element in the variable displacement hydraulic pump 221. With this configuration, the hydraulic servo mechanism suitable for the radial piston type hydraulic element can be formed while suppressing an increase in the number of components. Note that in the example illustrated in FIGS. 10 and 12, no hydraulic oil flows into the first oil chamber 250a and the hydraulic oil flows into the second oil chamber 250b.

The ring 257 has a sealing surface which contacts part of the cases 20a, 20b to seal the first oil chamber 250a and the second oil chamber 250b. With this configuration, a power loss due to leakage of the hydraulic oil can be reduced. In the present embodiment, the sealing surface is provided on the outer peripheral surface of the ring 257 and the end surface of the ring 257 in the thickness direction (axial direction).

Specifically, the sealing surface provided on the outer peripheral surface of the ring 257 is the pair of flat parts 257a described above. The pair of flat parts 257a contacts the pair of flat portions PP of the housing recess 20a1 of the front case 20a so that the outer surface of the ring 257 and the inner surface of the housing recess 20a1 can contact with each other across a wide area. As a result, sealability between the first oil chamber 250a and the second oil chamber 250b can be improved, and occurrence of oil leakage between both oil chambers can be reduced. Note that in the present embodiment, the sealing surface provided on the outer peripheral surface of the ring 257 is a flat surface, but is not limited thereto and may be a curved surface.

Specifically, the sealing surface provided on the end surface of the ring 257 in the axial direction is a front surface contact portion 257b of the front surface of the ring 257 in the axial direction, which contacts the inner surface of the front case 20a, and a rear surface contact portion 257c of the rear surface of the ring 257 in the axial direction, which contacts the front surface of the intermediate case 20b. The front surface contact portion 257b is provided so that forward leakage of the hydraulic oil from the first oil chamber 250a and the second oil chamber 250b can be reduced. The rear surface contact portion 257c is provided so that rearward leakage of the hydraulic oil from the first oil chamber 250a and the second oil chamber 250b can be reduced. Note that the ring 257 moves in the radial direction, and therefore, the positions of the front surface contact portion 257b and the rear surface contact portion 257c change. Each of the first oil chamber 250a and the second oil chamber 250b is a space surrounded by the outer peripheral surface of the ring 257, the inner surface of the housing recess 20a1, the bottom surface of the housing recess 20a1, and the annular front surface of the intermediate case 20b.

3. Modifications

3-1. First Modification

Figure 13:
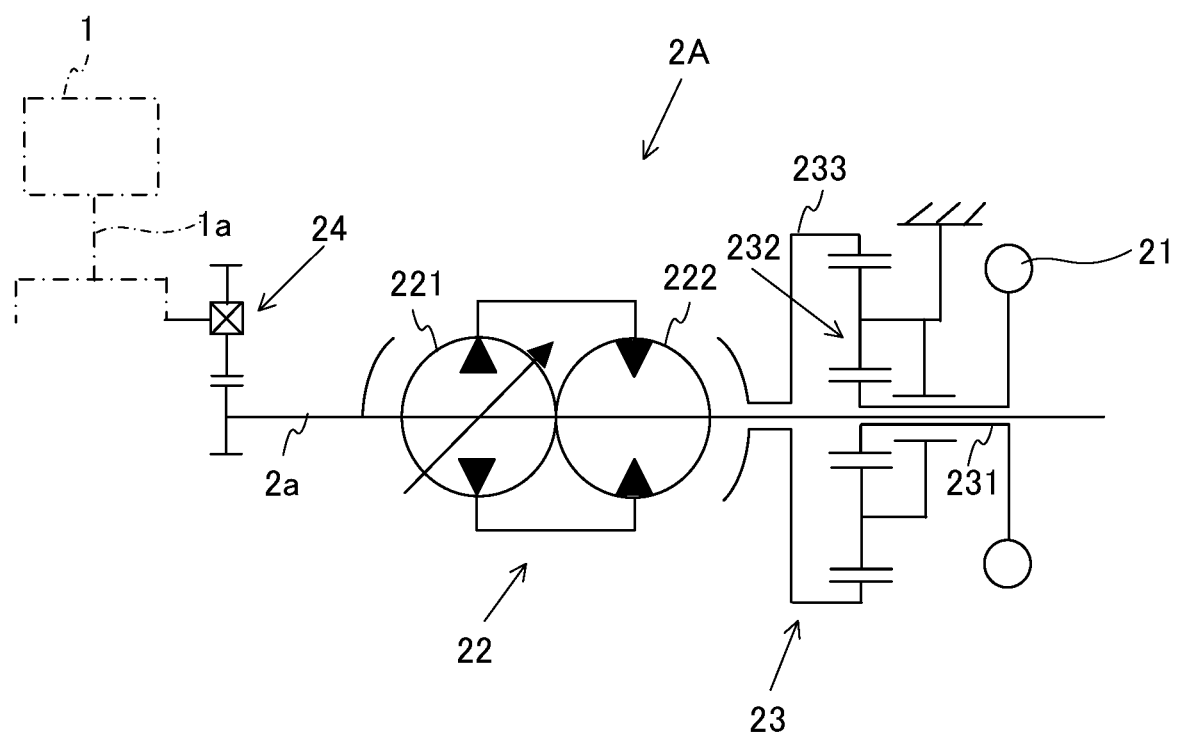
FIG. 13 is a diagram schematically illustrating the configuration of an energy storage device according to a first modification.

FIG. 13 is a diagram schematically illustrating the configuration of an energy storage device 2A according to a first modification. The energy storage device 2A includes a clutch 24 that switches between transmission and interruption of the power between the motor 1 and the hydraulic element 22. The clutch 24 can be configured using various known types of clutch. The clutch 24 may be, for example, a clutch having a mechanically engaging structure or a structure using frictional force.

In a case where the clutch 24 is in a state of transmitting the power, the flywheel 21 can store the energy by using the output of the motor 1 or release the energy to assist the output of the motor 1. In a case where the clutch 24 is in a state of interrupting the power, the flywheel 21 is disconnected from the motor 1, and therefore, cannot store the energy or release the energy toward the motor 1.

Note that in the present modification, the hydraulic element 22 (hydraulic continuously variable transmission element) that changes the rotation speed of the flywheel 21 is disposed between the clutch 24 and the flywheel 21. Thus, even in a case where the clutch 24 is changed from the power interruption state to the power transmission state, it is possible to reduce occurrence of impact and a frictional power loss.

Here, an example where the energy storage device 2A is used for load leveling of the motor 1 will be considered. In this case, as described above, even in a case where the output required for the motor 1 is low, the output of the motor 1 is maintained constant, and the output of the motor 1 is used to store the energy using the flywheel 21. When the state in which the output required for the motor 1 is low continues for a certain period, rotation of the flywheel 21 reaches the maximum rotation speed, and the amount of energy stored in the flywheel 21 becomes the maximum. In such a state, in a case where the state in which the output required for the motor 1 is low further continues, the output of the motor 1 is consumed by a power loss in the hydraulic element 22 even though the energy cannot be stored any more, and an energy efficiency may be degraded. In this respect, when the clutch 24 is provided in the energy storage device 2A as in the present modification, the energy storage device 2A can be disconnected from the motor 1 when there is a probability that the energy efficiency is degraded due to the energy storage device 2A being connected to the motor 1. With this configuration, it is possible to reduce a useless power loss and improve the energy efficiency.

3-2. Second Modification

Figure 14:
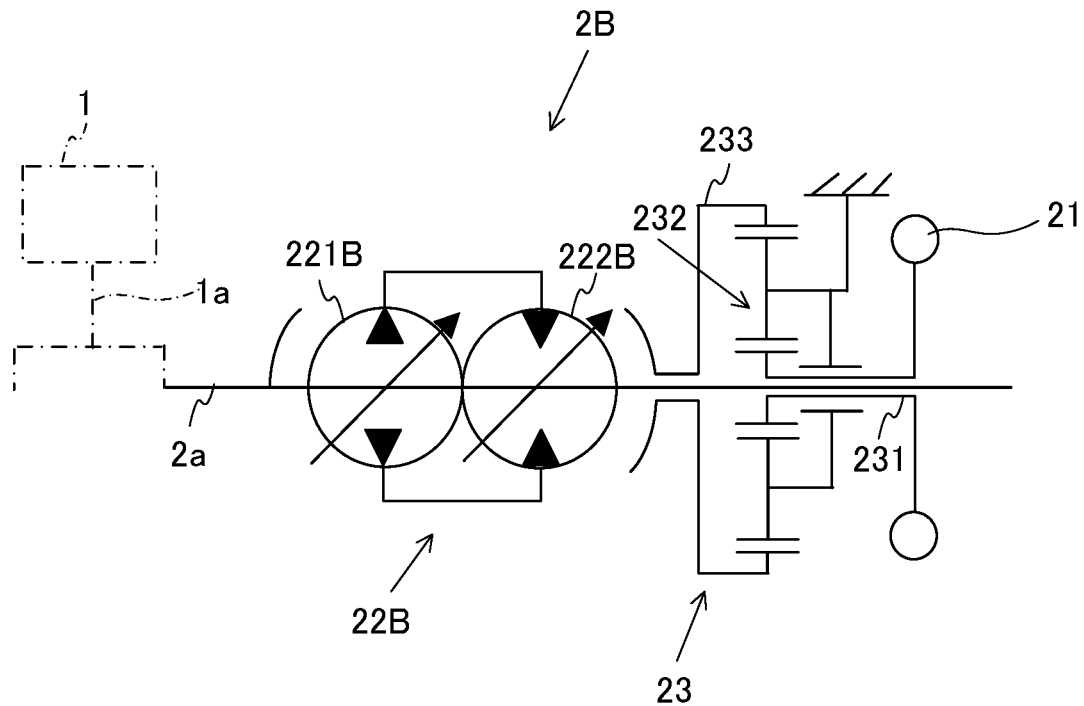
FIG. 14 is a diagram schematically illustrating the configuration of an energy storage device according to a second modification.

FIG. 14 is a diagram schematically illustrating the configuration of an energy storage device 2B according to a second modification. The energy storage device 2B of the present modification also includes a hydraulic element 22B similarly to the above-described embodiment. The hydraulic element 22B has a hydraulic pump 221B and a hydraulic motor 222B. The hydraulic pump 221B is a variable displacement hydraulic pump, and has a configuration similar to that of the above-described embodiment. Note that unlike the above-described embodiment, the hydraulic motor 222B is a variable displacement hydraulic motor in the present modification.

Note that the energy storage device 2B includes a hydraulic servo mechanism (not illustrated) for using the hydraulic pump 221B as a variable displacement element and a hydraulic servo mechanism (not illustrated) for using the hydraulic motor 222B as a variable displacement element. The configuration of each hydraulic servo mechanism may be similar to the configuration of the hydraulic servo mechanism 25 for the hydraulic pump 221 as described above.

Figure 15:
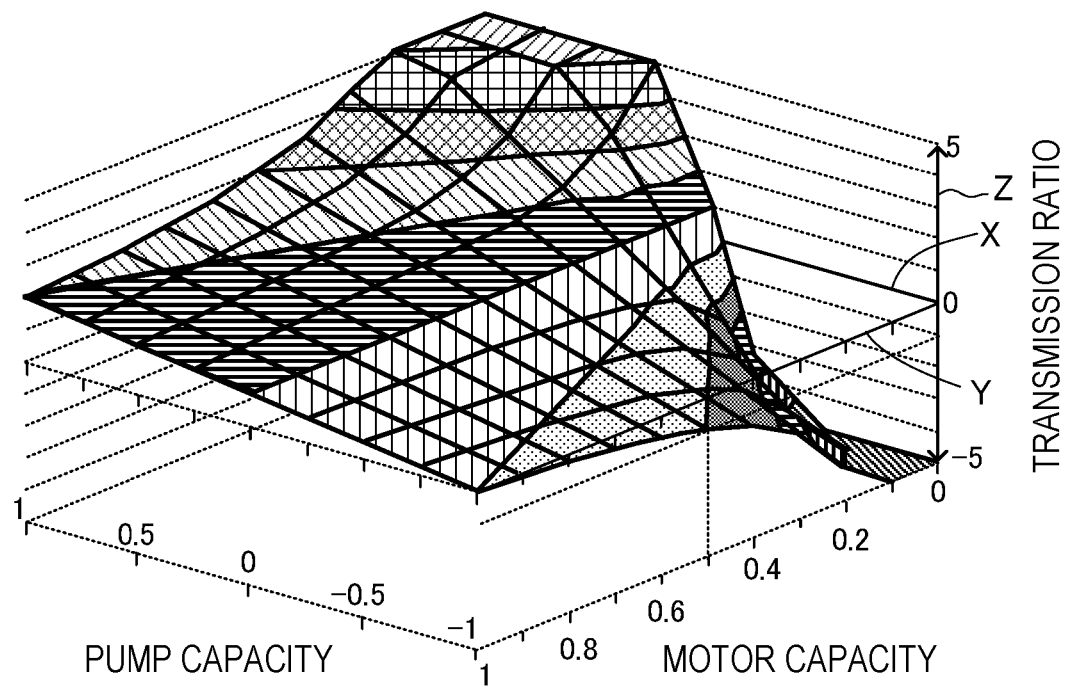
FIG. 15 is a graph showing a relationship between the capacities of a pump and a motor and a transmission ratio in the energy storage device of the second modification.

FIG. 15 is a graph showing a relationship between the capacities of the pump and the motor and a transmission ratio in the energy storage device 2B of the second modification. FIG. 15 is a graph showing calculation results in three dimensions. In FIG. 15, the X-axis indicates the capacity of the variable displacement hydraulic pump 221B, the Y-axis indicates the capacity of the variable displacement hydraulic motor 222B, and the Z-axis indicates a transmission ratio related to the rotation speed of the shaft 2a. Note that the X-axis and the Y-axis indicate normalized values. In addition, in FIG. 15, an auxiliary line indicated by a broken line is appropriately added so that the value of each axis in the graph can be easily understood. Further, in FIG. 15, with reference to a case where the transmission ratio is "1," every time the magnitude (absolute value) of change in the transmission ratio exceeds 1, the type of hatching is changed to make it easy to see the trend of the change in the transmission ratio with respect to a change in the capacity.

A variable displacement hydraulic pump 221B capacity of zero corresponds to a capacity in a case where the variable displacement hydraulic pump 221B is in a state of not discharging the hydraulic oil. The "positive" and "negative" values of the capacity of the variable displacement hydraulic pump 221B indicate cases where the capacity increases or decreases with reference to the zero capacity determined as described above. Note that in a case where the capacity of the variable displacement hydraulic pump 221B is zero, the transmission ratio is "1" regardless of the change in the capacity of the variable displacement hydraulic motor 222B.

When the capacity of the variable displacement hydraulic pump 221B becomes greater than zero in a state in which the capacity of the variable displacement hydraulic motor 222B is fixed, the speed is increased as compared to a case in which the capacity is zero. When the capacity of the variable displacement hydraulic pump 221B becomes less than zero in a state in which the capacity of the variable displacement hydraulic motor 222B is fixed, the speed is decreased as compared to a case in which the capacity is zero.

For example, in a case where the capacity of the variable displacement hydraulic motor 222B is "1 (100%)," when the capacity of the variable displacement hydraulic pump 221B is changed from "−1 (−100%)" to "+1 (+100%)," the transmission ratio changes from "0" to "+2." For example, in a case where the capacity of the variable displacement hydraulic motor 222B is "0.5 (50%)," when the capacity of the variable displacement hydraulic pump 221B is changed from "−1 (−100%)" to "+1 (+100%)," the transmission ratio changes from "−1" to "+3." For example, in a case where the capacity of the variable displacement hydraulic motor 222B is "0.1 (10%)," when the capacity of the variable displacement hydraulic pump 221B is changed from "−1 (−100%)" to "+1 (+100%)," the transmission ratio changes from "−5" to "+5."

That is, by using not only the hydraulic pump of the hydraulic element 22B but also the hydraulic motor of the hydraulic element 22B as variable displacement elements, a wide transmission range including forward and reverse rotation ranges can be achieved. Note that as illustrated in FIG. 15, in a case where only the hydraulic pump included in the hydraulic element is used as a variable displacement element and the hydraulic motor is used as a fixed displacement element, the transmission range tends to be narrowed. Note that in a case where the hydraulic motor is used as the fixed displacement element, a mechanism (hydraulic servo mechanism) for using the hydraulic motor as a variable displacement element is not required, and therefore, there are advantages that the energy storage device can be made compact and the number of components can be reduced.

4. Points to be Noted

Various changes can be made to various technical features disclosed in the present specification without departing from the spirit of the technical creation. In addition, a plurality of embodiments and modifications described in the present specification may be implemented in combination to the extent possible.

5. Appendix

An exemplary energy storage device of the present invention may be an energy storage device capable of storing energy, which includes a flywheel driven by a motor to store and release rotation energy and a hydraulic element disposed between the motor and the flywheel to change the rotation speed of the flywheel (first configuration).

In the energy storage device having the first configuration, the hydraulic element may be a hydromechanical continuously variable transmission (second configuration).

The energy storage device having the first or second configuration may further include a reducer disposed between the hydraulic element and the flywheel (third configuration).

In the energy storage device having the third configuration, the reducer may be arranged coaxially with the hydraulic element and the flywheel (fourth configuration).

The energy storage device having the third or fourth configuration may further include a housing that houses the hydraulic element and the reducer (fifth configuration).

The energy storage device having any one of the first to fifth configurations may further include a clutch that switches between transmission and interruption of power between the motor and the hydraulic element (sixth configuration).

In the energy storage device having any one of the second to sixth configurations, a plunger member provided in the hydraulic element may move in a radial direction perpendicular to the axial direction of the hydraulic element (seventh configuration).

In the energy storage device having the seventh configuration, the plunger member may be a sphere (eighth configuration).

In the energy storage device having any one of the first to eighth configurations, the hydraulic element may have a hydraulic pump and a hydraulic motor, and the hydraulic pump may be a variable displacement hydraulic pump (ninth configuration).

In the energy storage device having the ninth configuration, the hydraulic motor may be a variable displacement hydraulic motor (tenth configuration).

The energy storage device having the eighth or ninth configuration may further include a hydraulic servo mechanism that controls the capacity of the variable displacement hydraulic pump (eleventh configuration).

In the energy storage device having the eleventh configuration, the variable displacement hydraulic pump may have a ring provided so as to be movable in position by the hydraulic servo mechanism, a case surrounding the outer periphery of the ring, and a first oil chamber and a second oil chamber provided between the ring and the case and partitioned from each other (twelfth configuration).

In the energy storage device having the twelfth configuration, the ring may have a sealing surface contacting part of the case to seal the first oil chamber and the second oil chamber (thirteenth configuration).

In the energy storage device having the thirteenth configuration, the sealing surface includes the outer peripheral surface of the ring and an end surface of the ring in the thickness direction thereof (fourteenth configuration).

An exemplary work machine of the present invention may include the motor and the energy storage device having any one of the first to fourteenth configurations (fifteenth configuration).

LIST OF REFERENCE SIGNS

1 Motor
2, 2A, 2B Energy Storage Device
20 Housing
20a Front Case
20b Intermediate Case
20c Rear Case
21 Flywheel
22, 22B Hydraulic Element, Hydromechanical Continuously Variable Transmission
23 Reducer, Planetary Gear Reducer
24 Clutch
25 Hydraulic Servo Mechanism
200 Work Machine
221, 221B Hydraulic Pump, Variable Displacement Hydraulic Pump
222 Hydraulic Motor
222B Hydraulic Motor, Variable Displacement Hydraulic Motor
250a First Oil Chamber
250b Second Oil Chamber
257 Movable Member, Ring
257a Flat Part (Sealing Surface)
257b Front Surface Contact Portion (Sealing Surface)
257c Rear Surface Contact Portion (Sealing Surface)
C Center Axis
PL1, PL2 Plunger Member

The invention claimed is:

1. An energy storage device capable of storing energy, the energy storage device comprising:
a flywheel that is configured to be driven by a motor to store and release rotation energy; and
a hydraulic element that is disposed between the motor and the flywheel and is configured to change a rotation speed of the flywheel,
wherein the hydraulic element includes a plunger member configured to move in a radial direction perpendicular to an axial direction of the hydraulic element.

2. The energy storage device according to claim 1, wherein the hydraulic element is a hydromechanical continuously variable transmission.

3. The energy storage device according to claim 1, further comprising a reducer that is disposed between the hydraulic element and the flywheel.

4. The energy storage device according to claim 3, wherein the reducer is arranged coaxially with the hydraulic element and the flywheel.

5. The energy storage device according to claim 4, further comprising a housing that is configured to house the hydraulic element and the reducer.

6. The energy storage device according to claim 1, further comprising a clutch configured to switch between transmission and interruption of power between the motor and the hydraulic element.

7. The energy storage device according to claim 1, wherein the plunger member is a sphere.

8. The energy storage device according to claim 1, wherein the hydraulic element has a hydraulic pump and a hydraulic motor, and the hydraulic pump is a variable displacement hydraulic pump.

9. The energy storage device according to claim 8, wherein the hydraulic motor is a variable displacement hydraulic motor.

10. The energy storage device according to claim 8, further comprising a hydraulic servo mechanism configured to control a capacity of the variable displacement hydraulic pump.

11. The energy storage device according to claim 10, wherein the variable displacement hydraulic pump has:
a ring provided so as to be movable in position by the hydraulic servo mechanism,
a case surrounding an outer periphery of the ring, and a first oil chamber and a second oil chamber provided between the ring and the case and partitioned from each other.

12. The energy storage device according to claim 11, wherein the ring has a sealing surface contacting part of the case configured to seal the first oil chamber and the second oil chamber.

13. The energy storage device according to claim 12, wherein the sealing surface contacting part includes:
   an outer peripheral surface of the ring, and
   an end surface of the ring in a thickness direction.

14. A work machine comprising:
   the energy storage device according to claim 1; and
   the motor.

15. An energy storage device capable of storing energy, the energy storage device comprising:
   a flywheel that is configured to be driven by a motor to store and release rotation energy;
   a hydraulic element that is disposed between the motor and the flywheel and is configured to change a rotation speed of the flywheel, wherein the hydraulic element has a hydraulic pump and a hydraulic motor, and the hydraulic pump is a variable displacement hydraulic pump;
   a hydraulic servo mechanism configured to control a capacity of the variable displacement hydraulic pump;
   wherein the variable displacement hydraulic pump has:
      a ring provided so as to be movable in position by the hydraulic servo mechanism,
      a case surrounding an outer periphery of the ring, and
      a first oil chamber and a second oil chamber provided between the ring and the case and partitioned from each other.

* * * * *